United States Patent

[11] 3,594,757

| [72] | Inventors | Jerold H. Gard |
| | | Los Altos; |
| | | Charles L. McAfee, San Jose, both of, Calif. |
| [21] | Appl. No. | 714,512 |
| [22] | Filed | Mar. 20, 1968 |
| [45] | Patented | July 20, 1971 |
| [73] | Assignee | Kaiser Aerospace & Electronics Corporation |
| | | Oakland, Calif. |

[54] WAVEFORM GENERATOR FOR PROVIDING TAPE DISPLAY OF CONTINUOUSLY CHANGING DATA
20 Claims, 11 Drawing Figs.

[52] U.S. Cl. ........................................ 340/324 A,
340/325
[51] Int. Cl. ........................................ G06f 3/14
[50] Field of Search ........................................ 343/11;
340/324.1, 25, 324 A; 315/19, 18

[56] References Cited
UNITED STATES PATENTS

| 2,394,196 | 2/1946 | Morgan | 340/324.1 |
| 3,011,164 | 11/1961 | Gerhardt | 340/324.1 |
| 3,297,993 | 1/1967 | Clapper | 340/324.1 |
| 3,343,030 | 9/1967 | Dragon et al. | 340/324.1 |
| 3,474,438 | 10/1969 | Lauher | 340/324.1 |

*Primary Examiner* — John W. Caldwell
*Assistant Examiner* — Marshall M. Curtis
*Attorney* — Johnson, Dienner, Emrich, Verbeck and Wagner ABSTRACT: Electronic generator for providing waveforms which provide a calligraphic display of a selected segment of a movable numerical scale or tape on a visual display device in response to digital inputs representing the information to be presented by the tape on the display.

PATENTED JUL 20 1971
3,594,757
SHEET 1 OF 5
FIG. 1
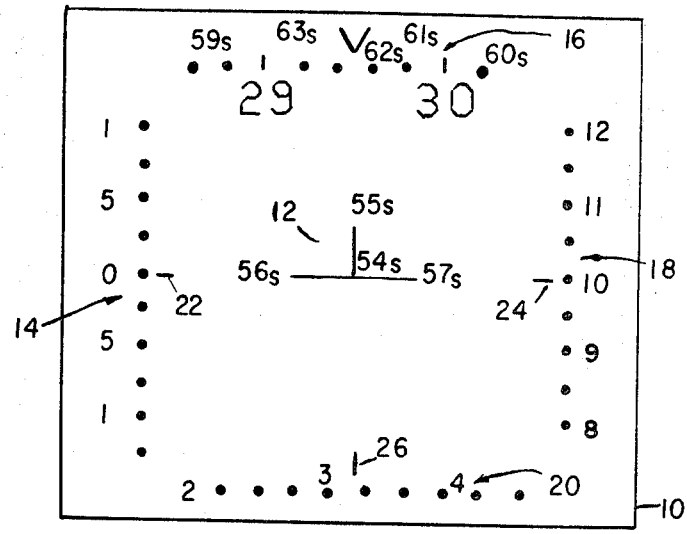
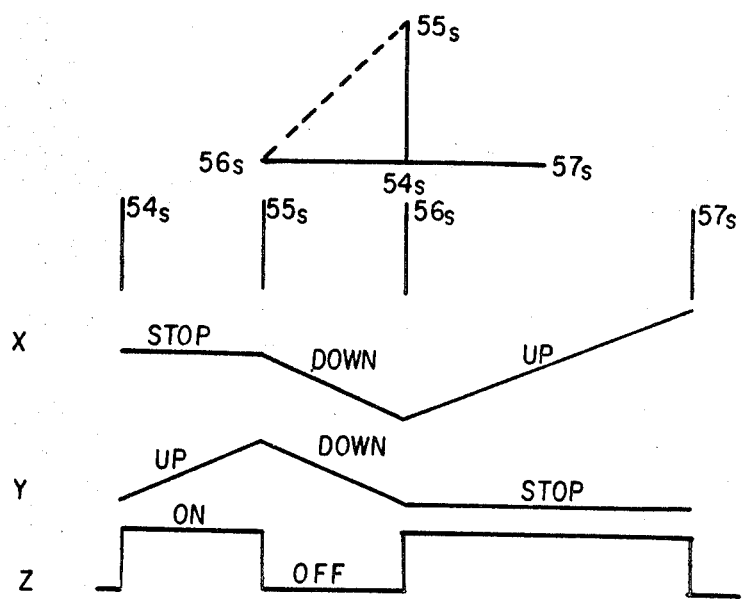
FIG. 2
| SCAN SEQ. | MAIN TIMER COUNT | Z BEAM | | X COUNTER | | | | | Y COUNTER | | | | |
|---|---|---|---|---|---|---|---|---|---|---|---|---|---|
| | | ON | OFF | CLOCK | PRESET | UP | DOWN | STOP | CLOCK | PRESET | UP | DOWN | STOP |
| 53s | 2750 | | X | C | 256 | | | X | C | 256 | | | X |
| 54s | 2800 | X | | | | | | | | | X | | |
| 55s | 2820 | | X | | | X | | | | | | X | |
| 56s | 2840 | X | | | | X | | | | | | | X |
| 57s | 2880 | | X | | 156 | | | X | | 428 | | | |
| | | | | | | | | | | | | | |
FIG. 3
INVENTORS
JEROLD H. GARD
CHARLES L. McAFEE
BY
Brown Jackson Bottcher & Dienner
ATTYS.

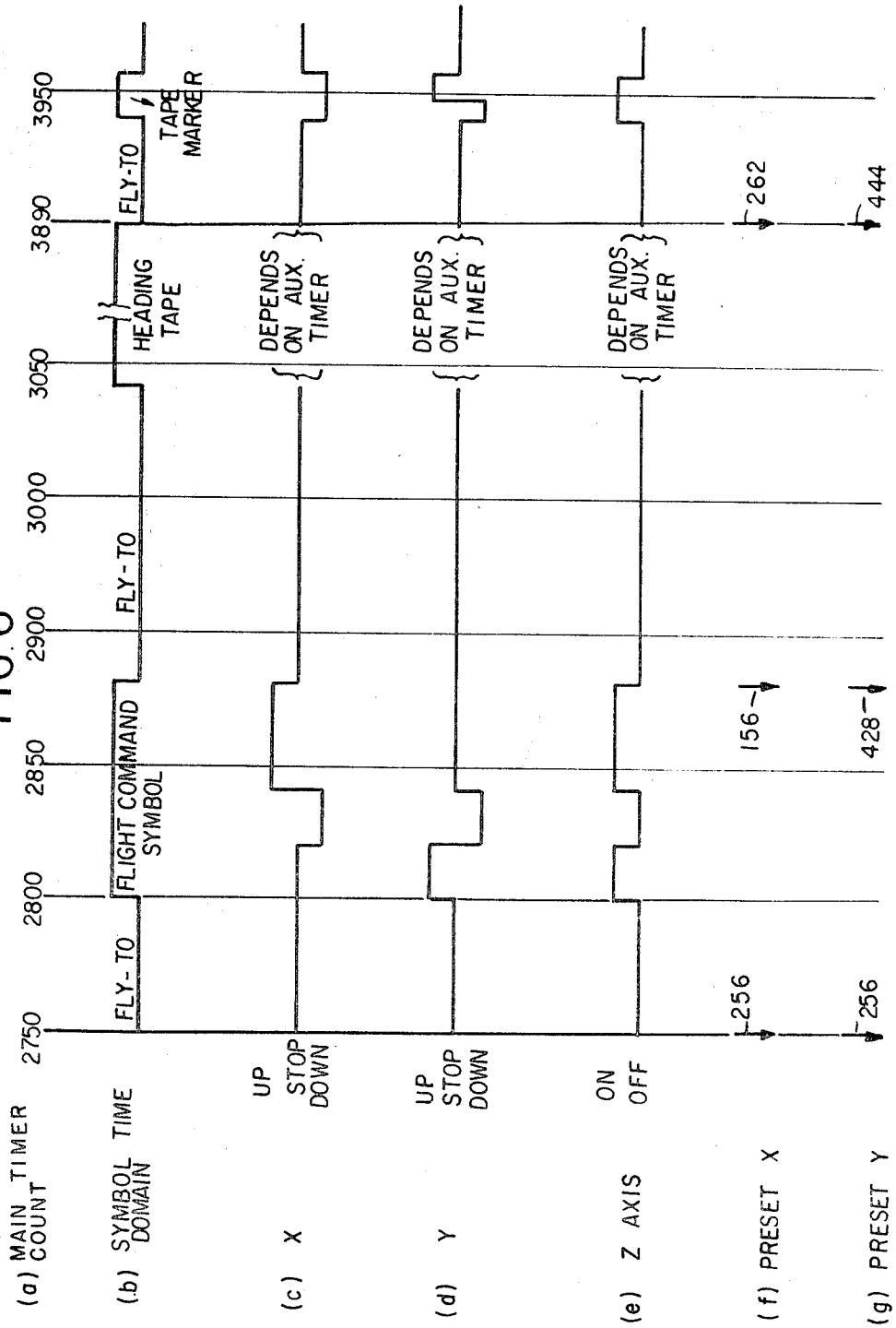

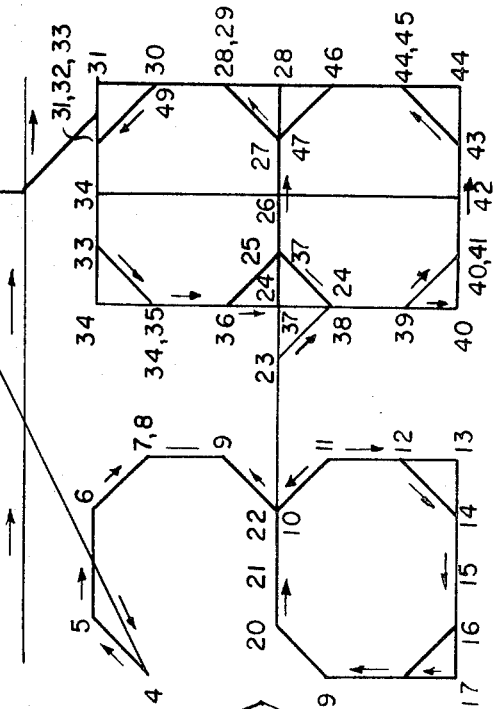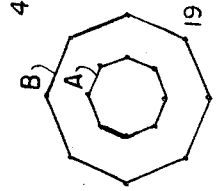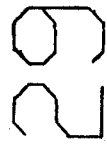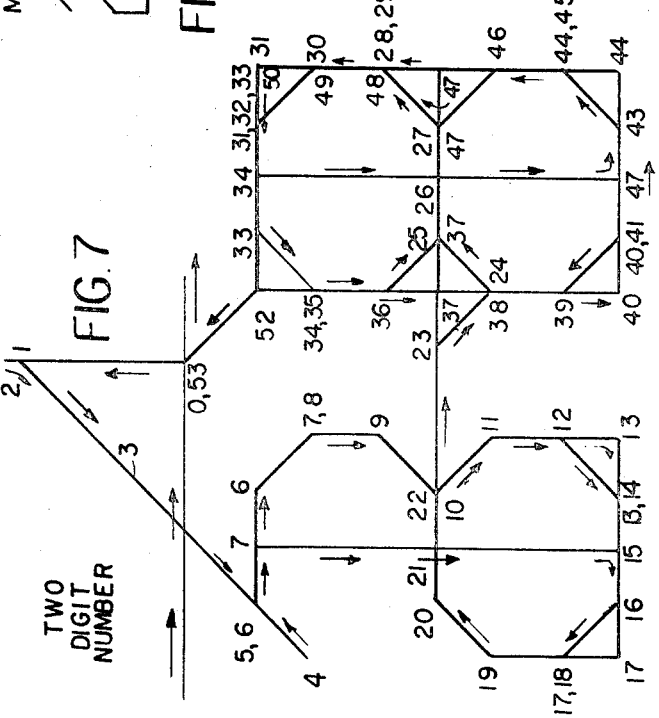

3,594,757

WAVEFORM GENERATOR FOR PROVIDING TAPE DISPLAY OF CONTINUOUSLY CHANGING DATA

BACKGROUND OF INVENTION

1. Field of Invention

The present invention relates to display generator circuitry for aircraft use of the type found in Class 343-11.

2. Description of Prior Art

The art of visual display is defined as the act and service of collecting, transforming or arranging information for communication to human beings through their visual senses. While much work has been done in the field relative to the accumulation and storage of information, the development of equipment for displaying the collected information to the intended user has progressed less rapidly, and in many instances available display equipment does not have the ability to communicate the desired information to the intended user in a usable format in the allotted time.

One problem frequently encountered in the field is the inability of known equipment to effectively present the material to the user in a form which permits quick, instantaneous assimilation of the displayed information through his visual senses. In one specific example, which is described more fully hereinafter, it is well known that the pilot of an aircraft during flight is required to continually monitor a large panel of instruments, and to control flight of the aircraft in accordance with the information presented on such panels.

During takeoff and landing it is not unusual for the pilot to be required to make split second decisions, and the need to examine a large number of different instruments and assimilate the information presented thereon obviously makes such task quite difficult.

There has been a continuing effort in the field to develop a display which integrates a large amount of the information normally provided by a plurality of aircraft instruments into a single display. While integration of the information in a single display has considerably improved communication between the equipment and the pilot, continued research on the subject has made apparent that a further important step in the communication of information to the pilot must be the provision of a display format which is more readily accepted by the pilot in a quick visual scan of the instruments of the display.

SUMMARY OF INVENTION

It has been found that when brief, almost instantaneous viewing is necessary, certain information is best communicated through means of a tape or scale-type display in association with alpha-numeric legends. However, the provision of a display of the changing information in such format on a cathode-ray tube along with other information, in the line writing times normally available is difficult. It is an object of the present invention to provide a novel electronic system using digital circuit techniques to provide X, Y deflection waveforms for use in the provision of a tape or scale presentation of information on a cathode-ray tube.

It is a specific object of the present invention to provide a novel system which is responsive to digital inputs to provide a display of a movable tape which provides continuously changing numeric information on a cathode-ray tube.

The provision of information in such manner is particularly difficult in that in the display of certain types of information, as for example, the display of the aircraft heading to the pilot, only a portion of the full tape length is shown, and the portion which is shown is subject to instantaneous and frequent change at varying rates. Thus, as in a conventional-type compass only 17—18° of the heading are displayed to the pilot so that assimilation of the data presented can be more quickly effected by the pilot. With changing of the aircraft heading, the rate of change of the tape data presented on the display must be related to the aircraft change of heading, and the particular numerics displayed and position of the numerics displayed must be changed therewith. Such display criteria are difficult to meet, and the provision of such display in response to digital inputs in a calligraphic display having limited times available for such trace is even more difficult. The present invention is directed to an electronic waveform generator circuit which is operative to provide such function.

BRIEF DESCRIPTION OF THE DRAWINGS

In the accompanying drawings,

FIG. 1 is a partial illustration of a display of a plurality of tape cues and a command symbol for use in providing information to an aircraft pilot;

FIG. 2 is a showing of waveforms used to generate the command symbol of FIG. 1;

FIG. 3 comprises a descriptive table for identifying a programmed sequence for use in generation of the waveforms of FIG. 2;

FIG. 6 shows a set of waveforms with representative times for generation of a portion of a format which includes the tape of FIG. 1;

FIGS. 7—10 illustrate the matrix generator of the numeric used in the tape display; and FIG. 11 illustrates the manner in which variation of a clock scan rate to the auxiliary timer circuit can be used to provide a given symbol in different sizes.

GENERAL DESCRIPTION

Display Format

Figure 4:
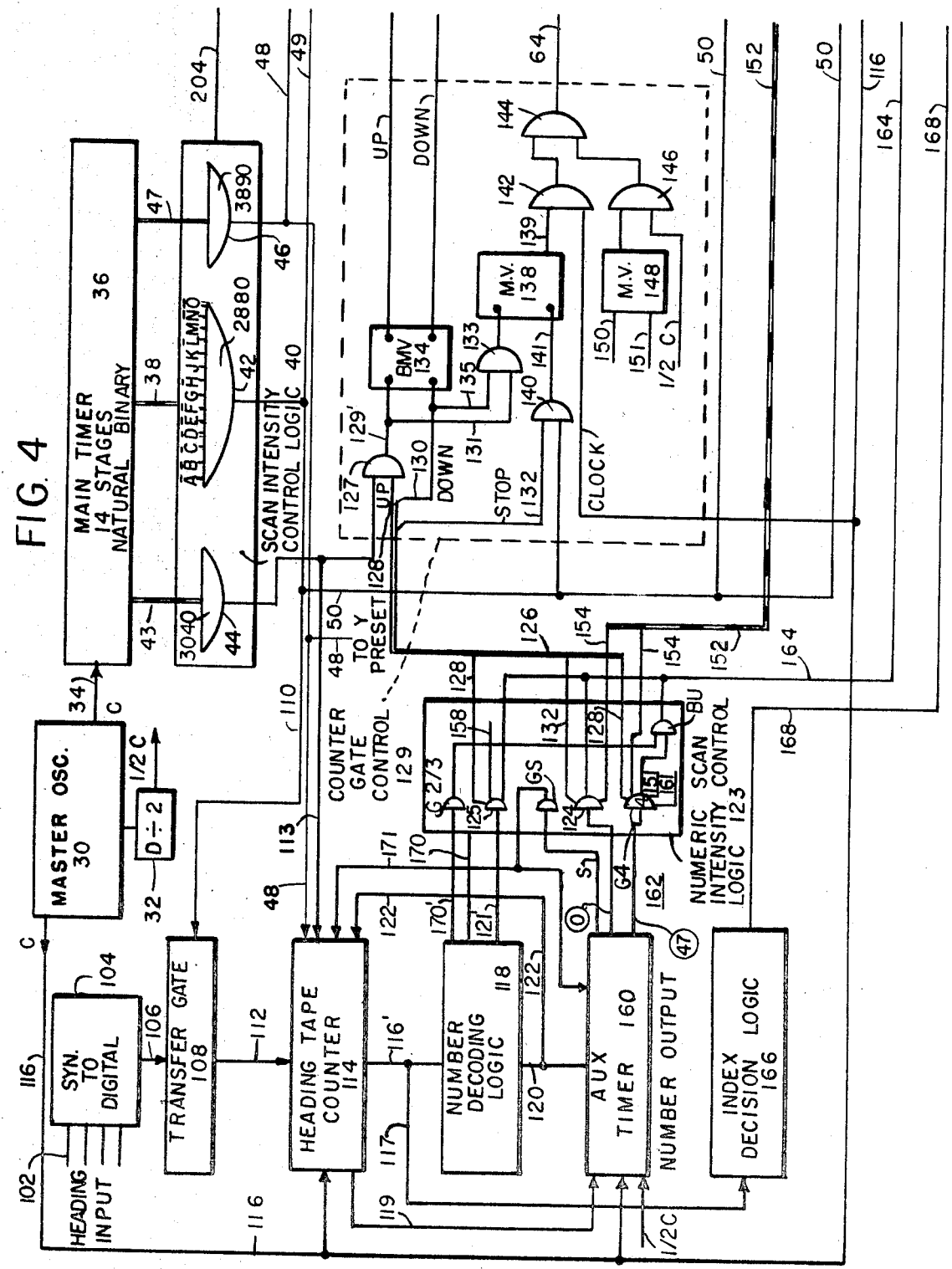
FIGS. 4 and 5 set forth the circuit of the invention for generating the movable tape displays.

With reference to FIG. 1, there is shown thereat a display format 10 including certain of the cues which may be presented on a cathode-ray tube for use by a pilot in the control of an aircraft. In the interest of more clearly showing the invention, the display showing has been limited to a flight command symbol 12 which may be used to direct the pilot in his control of the aircraft elevation and azimuth in a manner known in the art, and four tape (or scale) displays including a vertical velocity tape 14, a heading tape 16, an altitude tape 18, and an airspeed tape 20. Obviously an aircraft display will have other cues in addition to those shown in FIG. 1, and in some instances may not include all four of the tapes illustrated.

The flight command symbol 12 is primarily shown for purposes of providing a more complete picture of the planned program for a beam in the trace of a set of symbols, such as shown in format 10, and the manner in which the tape display generation is included in such program. The "s" numbers identify the different scan commands identified sequentially throughout the program.

The trace of the flight command symbol 12 is initiated, in the present example, at scan command 54s (i.e., 53 other scan commands have preceded this scan command in the program). The symbol can be positioned to different vertical coordinates to portray an increase or decrease of the desired aircraft elevation, and can be positioned horizontally to command left and right azimuth changes. The resultant symbol position will correspond to the vector sum of the two inputs. The correct response by the pilot is to maneuver the aircraft such that the symbol remains at the display center which may be marked by a fixed reticle identifying aircraft boresight on the face of the tube. With zero command steering error, the symbol holds at the center of the display. In other versions, the two lines of the command symbol are moved independently to provide the desired command display.

Vertical velocity is displayed on a moving tape 14 showing five numeric positions with ten index marks used to indicate intervals of 25 feet/min. The total tape length will be dictated by aircraft requirements — it may be ±1000 feet/min. or more. A fixed index marker 22 is used with the vertical velocity tape to indicate the vertical velocity to the pilot. With changes in vertical velocity, the numeric tape moves vertically to locate vertical velocity information adjacent the fixed marker 22.

Heading information is provided by a compass tape 16 which is displayed as a scale continuous through 360° of heading, one only 17° segment of which is shown on the display. Markers or indices are located at each 2° interval between numbers which in turn are located at 10° intervals. To simplify the display, only one and two digit numbers are used, the number 36 representing 360°, for example, and the number "1" representing 10°. The tape moves laterally with heading change to provide the actual compass heading readout at the heading reference marker V. In the illustration of FIG. 1, the aircraft heading is shown to be 295°.

Altitude information is displayed on a vertically displaceable tape 18, the altitude being marked relative to a fixed marker 24 in numerics at 100 foot intervals with tape index marks displayed at 50 foot intervals between the numerics. A maximum of six numeric index positions are displayed at one time. In the illustration of FIG. 1, the aircraft is shown to be at an altitude of 1000 feet.

Airspeed information is displayed on a moving tape 20, the speed being marked relative to a fixed marker 26 in numerics at 100 knot intervals with tape index markers displayed at 25 knot intervals between the numerics. In the illustration of FIG. 1, the aircraft air speed is shown to be 315 knots.

Display Generator Program

As will now be shown, the novel system basically comprises a control circuit which uses digital techniques to generate X, Y deflection waveforms for use in providing a calligraphic (line-writing) display of a format of the type shown in FIG. 1. Fundamentally, each symbol is drawn by the electron beam gun of a cathode-ray tube, the beam being controlled in a time sharing program to trace each of the symbols in a predetermined sequence at fixed points in time. The command symbol 12 (FIG. 1) is traced in response to a set of waveforms shown in FIG. 2, each trace by a beam in providing the symbol (and a symbol may be comprised of one or more traces) being identified in the drawing by two "s" numerals. Numerals 54s—57s represent the five scans used in providing the flight command symbol, numerals 59s—60s represent the scans for the heading tape, and numerals 61s—63s represent the scans for the heading marker used with the heading tape.

Representative scan sequences 54s—57s are shown in the scan control logic table in FIG. 3, which comprises a small portion of the table used in programming the full display. As shown in the left hand column thereof, the flight command symbol 12 is traced during scan sequences 54s—57s (53 traces having been previously used in the trace of other symbols).

The next column of the table shows that the scan command 53s is initiated at count 2750 of a main timer counter (to be described) which cyclically counts from 0 —16384 in the manner of a clock. Each movement of the beam is locked to a specific clock count output from the main timer. The following column Z (beam) axis identifies the clock counts at which the beam is turned on and off; the "X counter" includes a preset column which identifies the specific "X" coordinates (256) to which the beam is moved prior to the start of the trace of the command symbol, and the counts at which the beam is moved laterally to the right and to the left (up, down) and stopped. The clock and one-half clock column indicate the rate of movement of the beam in the indicated direction. The "Y counter" table provides like information for effecting vertical displacement of the beam. The significance of such table will become more apparent after a brief consideration of the line writing techniques employed in the provision of such traces.

Symbol Line Writing

As noted above, the calligraphic display basically comprises a Cartesian coordinate system which is provided by the simultaneous applications of X, Y deflection waveforms to produce currents in the deflection yoke of an electromagnetic system. As will be shown with reference to FIGS. 2 and 3, the magnitude of the X current will determine the lateral deflection of the cathode-ray tube electron beam, and the magnitude of the Y current will determine the vertical deflection of the electron beam. Thus a horizontal line will be produced by the simultaneous application of a sawtooth to the X deflection yoke and a DC input to the Y deflection yoke, the value of the sawtooth signal determining the extent of lateral movement of the beam and the value of the DC signal determining the vertical height of the lateral trace on the cathode-ray tube. Stated in another manner, the length of the line is a function of the sawtooth input to the X deflection yoke, and the vertical position of the line is a function of the DC input to the Y deflection yoke.

By way of example, the waveforms shown in FIG. 2 will provide the flight command symbol 12 of FIG. 1, the sequence of such waveforms being identified in FIG. 3. As shown by the first line of FIG. 3, at count 2750 of the main timer, a pair of X and Y counters (to be described later) are preset to counts 256, 256 and the beam is moved to position 54s (FIG. 1). At count 2800, the beam is turned on. The vertical line of the symbol 12 is produced by the beam in its vertical displacement from 54s by the sawtooth waveform output from the Y counter to the Y deflection yoke while the DC input from the X counter to the X deflection yoke determines the lateral coordinate of the line (256 in the present example). The time duration of the Y sawtooth, and therefore the length of the vertical line, is determined by the number of clock pulses which have been programmed to produce the symbol (20 pulses in the present example). At count 2820 of the main timer scan command 55s is initiated. As shown in the table of FIG. 3 the beam is turned off, and both the X and Y sawtooths are decreased at the same clock rate until count 2840 to move the beam to position 56s.

At count 2840, the scan command 56s is initiated, and the beam is turned on, the Y counter is stopped and the X counter is turned on to provide a sawtooth input to the X deflection coil for 40 counts which drives the beam toward position 57s to provide the base line of the symbol. At count 2880, scan command 57s occurs, and the beam is turned off; X, Y counters are stopped; and the presets 156, 428 are inserted to move the beam toward its initial position 59s for trace of the next symbol in the program (altitude tape) display in the present example.

While the command symbol may be traced in other patterns, the forgoing example was given to show that (a) the application of a Y sawtooth and an X DC input provides a vertical line having a length which is the function of the Y sawtooth and a lateral position which is a function of the X input; and that the sawtooth is a function of a programmed count; (b) a 45° line is provided by the application of equal amplitude sawtooths to both X and Y; and (c) a horizontal line is produced by application of a sawtooth waveform to X and a DC input to Y, the vertical position of the line being a function of the DC input and the length of the line being a function of the sawtooth (and therefore the programmed count). As will be shown, the slope of the line traced on the cathode-ray tube can be changed by varying the clock rate used in the generation of the X or Y sawtooth relative to one another.

General Circuit Description

With reference now to FIG. 4, the novel waveform generator which operates to produce the novel tape displays of the invention is shown thereat. As there illustrated, a master oscillator 30 is continuously operative to provide clock pulses over paths 34, 116 to the system at the 500 kc. rate. An associated divider circuit 32 (D2) provides clock pulses at the one-half C rate (250kc) to various components in the system which are identified by the "½C" legend.

A main timer 36 comprising a 14 stage natural binary counter is driven by the clock pulses on conductor 34, and provides a count in the binary code over the conductors of paths 38, 43, 47 to a scan intensity control logic circuit 40. A counter of the type which may be employed for such purpose is shown in the text book "Pulse, Digital & Switching Waveforms," page 669, Millman & Taub, published by McGraw-Hill, 1965.

For the purpose of reducing the number of conductors in path 38, a first level decoder (not shown) would normally be connected between the main timer 36 and the scan intensity control logic circuit 40. Such circuit would be comprised of 14 gates divided into four groups (3,3,4,4) having their inputs connected over 28 conductors to the output of the main timer 36, and having output marking conductors (8, 8, 16, 16) connected to the scan intensity control logic circuit 40 to provide the count output of the timer in binary code thereto. Circuitry for effecting such manner of control is shown in "Digital Computer & Control Engineering," R. S. Ledley, published by McGraw-Hill, 1960, P. 548.

However, for purposes of a less complex disclosure, the scan intensity control logic circuit 40 will be shown herein as comprising an output gate for each effective count of the timer. Thus gate 42 is shown connected to conduct when the output of the binary counters is 2880 (the input to gate 42 at such time being $\overline{A}\ \overline{B}\ \overline{C}\ \overline{D}\ \overline{E}\ F\ G\ \overline{H}\ J\ K\ \overline{L}\ M\ \overline{N}\ \overline{O}$), gate 44 is connected over path 43 to operate at count 3040 (the 14 connections over path 43 being obvious from the previous example), and gate 46 over path 48 operates at count 3890. As noted above, scan intensity control logic circuit 40 will have a separate gate for each count at which a control is to occur.

The purpose of these gates will be described in detail hereafter. At this time it is to be understood that the inputs of the gates, such as 42, 44, etc., are connected to operate at different predetermined counts of the main timer 36.

A control gate 42 (count 2880) is connected over output 49 to specific gate inputs of the X preset circuit 52 (FIG. 5), the particular gates to which the output of gate 42 is connected being determined by the X coordinate to which the beam is to be moved on the display 10 (FIG. 1) at count 2880. In the present example, gate 42 is connected to preset the beam at the start of the heading tape trace (position 59s in FIG. 1), the X coordinate of such position being 156. The output path 49 is therefore connected to gates P1—P18 in preset circuit 52 in the pattern 001110010 to set a count of 156 over the S, R, outputs thereof to the inputs of reversible counter 54. Reversible counter may be of the type described in detail in the text "Pulse Digital and Switching Waveforms," Millman and Taub, 1965, Paragraph 18.2, P.671.

Gate 2880 is also connected over path 50 to the Y preset gate 56 for a second reversible counter 58 which is identical to reversible counter 54. In the present example, path 50 is connected to the gate in preset circuit 56 which sets count 428 into the Y reversible counter 58 (the initial Y coordinate 59s for trace of the heading tape). Summarily, when timer 36 advances to count 2880, gate 42 via preset circuits 52, 56 sets counts 156, 428 respectively into reversible counters 54, 56. As will be shown, such counts move the beam from position 57s to position 59s on the display 10. After the beam has been moved to a starting position, signals are applied to inputs 60, 62, 65 for reversible counter 54 and inputs 68, 70, 72 for reversible counter 58 to effect the desired symbol trace in a manner to be described.

The output of reversible counter 54 is connected over path 74 to a digital to analog converter 78 which may be of the type shown in "Pulse Digital and Switching Waveforms," Millman and Taug, 1965, P. 674—675, and which is designed so that the maximum count (511) of the counter 54 will produce the maximum voltage (+10v.) from the converter 78 and the minimum count (0) will produce the minimum DC voltage (0v.). The output of converter 78 is fed over path 79 to a summer circuit 80 and over path 81 to deflection amplifiers 82 and path 84 to the horizontal deflection coils on the cathode-ray tube 100. The output of reversible counter 58 is connected over a similar path including digital to analog counter 90, summer 92, deflection amplifier 94 and conductor 95 to the vertical deflection coils of cathode-ray tube 100.

The deflection amplifier circuits 82, 94 to which the output of digital-analog converter 78, 90 is applied by summers 80, 92 respectively are designed so that +10v. corresponds to the maximum positive beam deflection (Y=up, X=right) and 0v. corresponds to the maximum negative deflection (Y=down, X=left). Thus as the counters 54, 58 change from one count to the next, the output of the digital-analog converter will change by (10v./512) =19.5 mv. Such arrangement will provide a linear displacement on the cathode-ray tube corresponding to an established scale factor which, in the present example, is designed so that a 2 inch by 2 inch area will exhibit a 0.004 inch/count resolution.

With reference to FIGS. 1 and 2, for (X=it will be seen that as the trace of the flight command symbol was completed the beam is at coordinates X=276 ; Y=256. As the timer advances from count 2879 (FIG. 3) to count 2880, the gate 42 presets the X counter 54 to X=156 and presets the Y counter 58 to Y=428, whereby the voltage output from the d/a converters 78, 90 is changed to a value which drives the beam to position 59s, (SX=3.04 volts); (Y=8.34 volts).

In a typical "head-up" display some of the symbols must be earth stabilized in roll and others must be aircraft stabilized. Aircraft stabilized symbol waveforms, such as heading and altitude tapes, are fed directly to the final summer 80 over path 79. Earth stabilized symbol waveforms, such as a horizon line symbol, are fed through a resolver incorporating a roll servo assembly and a sine/cosine potentiometer. The function of the summers 80, 92 is to recombine the resolved and unresolved waveforms prior to application to the deflection amplifiers and coils for the cathode-ray tube 100.

The summers 80, 92 may also be used to insert analog voltage input signals for symbol positioning as will be described more fully hereinafter.

It will be seen from the foregoing description that the display format is comprised of a plurality of different symbols, that the main timer runs through a given count for each format display, and, at preselected or preprogrammed counts, selected gates, such as 42, are connected to set the preset circuits 52, 56 to adjust the counters 54, 58 to the count which moves the beam to the X, Y coordinates assigned as the starting point for the trace of the symbol to be traced at that time in the timer cycle. The manner in which the novel system operates to move the beam in the trace of a display symbol, and particularly the heading tape of FIG. 1, is now set forth.

Time Sharing Program

In the interest of clarity, a typical program which more clearly shows the pattern in providing a plurality of symbols on a display format is shown in FIG. 6. The numerals extending across the top of the page (line a ) represent the count of the main timer 36; line (b) sets forth the time domain of each symbol in each cycle of the main timer; lines c,d,e set forth the command conditions for the X and Y counters, 54, 58, and the Z waveforms provided during the indicated counts of the main timer. Lines f and g illustrate the preset counts provided by the gates, such as 42, including the time of preset and "fly-to" time allotted after preset.

The X, Y waveforms (not shown) resulting from the X, Y commands of lines c, d will be sawtooth waveforms and/or DC voltages, whose amplitudes depend on time duration of the command, (Y command from 2800 to 2820 for example — FIG. 3—provides a sawtooth which drives the beam vertically), and whose DC levels depend upon preset conditions and other commands prior to stop commands, (Y command from 2840 to 2880 for example provides a DC level which results in the vertical position shown in FIG. 1).

By way of further example, generation of the waveforms for the flight command symbol 12 is initiated at count 2750 when a gate in the logic circuit 40 (not shown, but similar to gates 42, 44, 46) presets the X, Y preset circuits 52, 56 to set reversible counters 54, 58 to counts which will move the beam to X, Y coordinates 256, 256,respectively (lines f, g). Fly-to occurs between count 2750—2800 at which time trace of the flight command symbol is initiated. At count 2880 the trace of the flight command symbol is completed and gate 42 (FIG. 4) is enabled, and the preset circuits 52 and 56 are preset to adjust the beam to X, Y coordinates 156, 428 (lines $f$, $g$—FIG. 6) to prepare for the trace of the heading tape (see FIG. 1). "Fly-to" time in this case is 160 counts (2880—3040). As will be shown at count 3040, gate 44 (FIG. 4) is enabled to start the heading tape counter, and the heading tape is generated during counts 3040—3890.

Heading Tape Waveform Generator

At the time of preset of the counter 54, 58 (count 2880 of the main timer 36) to move the beam to position 59s as described, gate 42 also transmits an enabling signal over path 110 to transfer gate 108 which is similar to the transfer gate 68, FIG. 4, in U.S. Pat. No. 3,331,069, K. M. Cornell et al. The input to transfer gates 108 comprises a 14 wire path 106 over which the digital output of a synchro-to-digital converter 104 is transmitted in bit parallel format. The input of the synchro to digital converter 104 is connected over four conductors 102 to a synchro transmitter unit which provides the heading of the aircraft in standard AC synchro form.

In the present embodiment, an electromechanical servo driven shaft angle to digital converter of the type shown at "System Engineering," Goode & Machel, MCGraw-Hill, 1957, P.286—288 is used. In such configuration, it is possible to develop the necessary 8.5° zero offset between synchro input 102 and shaft encoder output 106 to produce centering of the heading tape relative to the heading pointer 61s, 63s. That is, in order to show 295° under the heading pointer, it is necessary that the data on conductor 106 be offset so that 295°−8.5°=286.5°. Such offset may also be developed using other known techniques.

Assuming the heading of the aircraft is 295°, the signal output of the synchro-to-digital converter on the fourteen wires 106 will be $$2 \quad 8 \quad 6 \quad 5$$
$$00 \ 0010 \ 1000 \ 0110 \ 0101$$

(286.5 in Binary Coded Decimal form). As the transfer gates 108 are enabled by gate 42 over conductor 110 at count 2280 of the main timer 36, the heading tape counter 114 is preset to the count which represents 286.5° in the manner described relative to the preset of reversible counters 54, 58 by preset circuits 52, 56.

The heading tape counter 114 in the present system is a BCD (Binary Code Decimal) counter with a range of 0 to 359.9° and preset capability. As will be shown, in the generation of the heading tape display 16, the heading counter 114 in effect, comprises translation means which expands an offset signal set (286.5°) which represents the heading (295°) into a 17° tape display which is a selected segment of a 360° tape. Moreover, with the slightest change of the aircraft heading the tape segment on the display is changed correspondingly. The tape segment presentation thus provided corresponds to the window type presentation of the conventional mechanical compass used on aircraft.

The heading tape counter 114 basically comprises four decades, each of which has a range of ten (except the most significant digit which is of range four) and provides the clock to the succeeding decade. Since numerics (as compared to marker indices) are to be generated at 10° intervals (i.e., 10°, 20°, 30°, etc.), a particular count from the units decade (typically 0) which is received at 10° intervals may be used via a number decoding logic circuit 118 to initiate operation of the auxiliary timer 160, which with logic circuit 123 controls reversible counter 54, 58 in the generation of the numeric matrix in a manner to be described.

With reference once more to the example in which the heading of 295° is fed over path 102 to the system, (and recalling that gate 42 transferred the digital input over path 112 to heading counter 114 at count 2880), as the main timer 36 now advances to count 3040, gate 44 enables heading counter 114 over path 113 to respond to the clock pulses on conductor 116 output from master oscillator 30, to thereby advance the count on the heading tape counter 114 from the value preset therein by gates 108.

With the beam at position 59s and assuming that the input data is such that the beam must be moved laterally before the first index marker is reached, number decoding logic circuit 118 (which comprises gates connected to the different count outputs of heading tape counter 114 in the manner of logic circuit 40) is operative via conductor 121' to enable gate 125 in the numeric scan intensity control logic circuit 123, which in turn via path 128 enables the AND gate 127 and bistable multivibrator 134 to provide a signal over "X-UP" input 60 to the reversible counter 54. Simultaneously gate 125 in control logic 123 via conductor 158 in path 152 enables the stop circuit in the Y counter gate control 155 for the reversible counter 58.

Counter Gate Control

Digressing briefly, it will be shown that counter gate control 129 (FIG. 4) comprises beam trace control means which includes a bistable multivibrator 134 which is connected to be set to provide an "up" or "down" signal to the reversible counter 54 over terminals 60, 62 respectively. Once set to a state, the multivibrator 134 remains in such state until the next signal is received. If, as in the present example, the "up" terminal 60 is marked, the reversible counter 54 will thereafter count up from the count registered thereon as each successive clock pulse is received over input terminal 65. As will be shown, whenever a command signal is provided over the up, down conductors 128, 130, to counter gate control 129, clock pulses will be transmitted to terminal 65 until a subsequent stop signal is received on conductor 132.

More specifically, a signal from logic circuit 123 on "up" conductor 128 enables gate 127 which in turn via conductor 129' enables bistable multivibrator 134 to mark the "up" input terminal to counter 54. Gate 127 via conductor 129', 131 and OR gate 133 also operates the multivibrator 138 to a state in which gate 142 is enabled to pass the clock pulses on conductor 116 to OR gate 144 and conductor 64 to the clock terminal 65.

In a similar manner, a "down" signal from logic circuit 123 on "down" conductor 130 in cable 126 will set multivibrator 134 to mark "down" terminal 62 of counter 54, and via conductor 135 and OR gate 133 to set multivibrator 138 to enable gate 142 to pass clock pulses on conductor 116 over gate 144 and conductor 64 to clock timer 65.

Stop signals from numeric scan circuit 123 over conductor 132 in cable 126 enable gate 140 which via conductor 141 operates multivibrator 135 to a state which disables gate 142 to terminate clock pulse feed to counter 54.

A further multivibrator 148 in the counter gate control 129 has an input 150 which as enabled, controls gate 146 to conduct 1/2C pulses over OR gate 144 and conductor 64 to counter 54. Signals on input 151 return the multivibrator to the state which disables AND gate 146 and terminates the 1/2C pulse feed to terminal 65.

The counter gate control 155 (FIG. 5) for controlling the Y reversible counter 58 is of a like structure, and is in turn controlled by "up," "down," stop, one-half clock signals received from the numeric scan circuit 123 over conductors 154, 156, 158, 160, 161 and 116 respectively.

In brief summary with an enabling pulse on either "up" conductor 128 or "down" conductor 130 for the "X" counter gate control 129, and no subsequent pulse on stop conductor 132, the counter 54 will increase (or decrease as the case may be) the count as each successive clock pulse is received at terminal 65 over the described path from the master oscillator 30. When a stop signal is received over conductor 132, the clock pulses will be blocked from the counter 54 until a subsequent up, down command is received over conductors 128, 130. Signals on conductors 150 151 permit a rate change of the clock pulses.

Reversible counter 58 for control of the beam trace "Y" is controlled in a like manner

Tape Generation

With reference once more to the format shown in FIG 1 and returning to the description of the heading tape generation, it will be recalled that gate 42 at count 2880 effected transfer of the heading information on input 102 to heading counter 114 (after conversion by synchro to digital converter 104). As the main timer 36 advances to count 3040, gate 44 via path 113 enables the heading tape counter 114 which with number decoding logic 118 and the auxiliary timer 160 provides two sets of output signals. The first set over conductor 121' controls generation of the tape format wherein the beam is driven laterally for 17° of trace, and the second set over conductor ⓪,⑰, etc., controls numeric generation in the tape display. More specifically as heading tape counter 114 is started, the first signal over conductor 116' to number decoding logic 118 results in a signal over path 121' to gate 125, and the "up" conductor 128 in cable 126 to gate 127 in counter gate control 129. Gate 127' via conductor 129 sets the multivibrator 134 to mark the "up" terminal 60, and via conductors 129', 131 sets multivibrator 138 to enable clock gate 142. As each successive clock pulse is received at terminal 65, the count on the counter 54 advances upwardly from the preset count of 156 (FIG. 6). During the successive clock pulses, the advancing count of the "X" counter is fed to the digital to analog converter 78, and the output of converter 78 raises 19.5mv./count. The increasing voltage as applied over the summer circuit 80 and deflection amplifier 82 provides an increasing current (a sawtooth waveform) to the horizontal coils 86 on display tube 100 to drive the beam horizontally to the right by a corresponding amount.

If a line trace is to be shown between the index markers on display, the output of gate 125 is also connnected over conductor 164 to bright up mixer 170, which via conductor 172 turns on the beam at a preset intensity. Bright up mixer 170 may comprise an OR gate connected to inputs 164, 168 along with a transistor connected in a switching configuration to enable the beam gun of display unit 100 as a signal is received over the OR gate from either conductor 164 or 168.

As the clock to the heading tape counter 114 over conductor 116 continues, the count of the counter 114 advances to a count which corresponds to the first encountered 2° index marker (288°in the example of FIG. 1). A gate in index decision logic 166 similar to gate 125 in logic circuit 123 recognizes such count and transmits a "bright-up" signal to bright up mixer 170 via conductor 168. With continued pulsing of the heading tape counter 114 by the clock pulses on conductor 116, and the advancement of the X counter in synchronism therewith by reason of the same clock pulse to input 64 of counter 54, (as the result of the initial enablement of the "X-UP" conductor 128 as the heading tape counter 116 was enabled), lateral movement of the beam from left to right on the display continues.

If it is desirable to produce a horizontal line trace for the tape and line indices at the 2° marker with a definite height rather than a dot index, such may be readily accomplished by utilizing a numeric matrix to effect beam control in the manner described below.

When the heading tape counter 114 reaches a count corresponding to a 10° heading increment (290° for example), a numeric is traced on the display, and number decoding logic circuit 118 which has a gate connected to recognize such counts, is operative via conductor 123 to stop heading tape counter 114 and at the same count the heading tape counter 114 via path 119 starts the auxiliary timer 160 in the generation of the numeric.

Since numerics are to be generated at 10° intervals, a particular count from the units decade of the heading tape counter 114 (typically zero) which is received at 10° intervals can be used as the pulse over conductor 119 to enable auxiliary timer 160. The auxiliary timer 160 comprises a binary counter which has its stages connected over a plurality of paths 162 to the inputs of the gates in logic circuit 123. The gates in logic circuit 123 are connected to control the counters 54, 58 in the generation of a numeric matrix, each gate having its input connected to recognize a predetermined count of auxiliary timer 160 and its output connected to effect a given control of reversible counters 54, 58. With reference to FIGS. 7 and 8, the manner in which each of a plurality of gates 0, 1, 2, etc., are connected to recognize such count output from the auxiliary timer 160 and to mark the appropriate "up" "down" stop conductors in cables 126, 152 to effect one scan of the matrix will be apparent. The numeric matrix scan provided by the auxiliary timer 160 will thus be generally the same for any numeric, the only variations being in connection of the gates to produce certain rounded numerics for aesthetic reasons and to unblank the bright up mixer circuit 170 via conductor 164 to produce the particular numeric identified to the auxiliary timer 160 by the numeric decoding logic 118. In the present example, 29 (=290°), the tens decade of the heading counter 114 i used to mark the unblank gates in logic circuit 118 for numeric "9" and the hundreds decade will mark the unblanking gates in logic circuit 118 for numeric 2.

As will be apparent by reference to FIGS. 7, 8, the matrix scan pattern provided by the auxiliary timer is such that after a numeric pattern generation including 53 scan and intensity control commands, the beam will have returned to the point at which the numeric trace was initiated (i.e., P.O, 53). This is the case whether a one digit or a two digit number is traced. Further the number of counts to produce a one digit or a two digit number are the same.

With reference to FIGS. 4, 5, 7 and 8, the operation of the circuitry auxiliary timer 160 in controlling the numeric scan logic 123 to trace the numeric pattern is similar to the operation of the logic circuit 40 in effecting trace of the flight command symbol 12. As a numeric pattern or matrix is initiated a first gate 124 in numeric scan circuit 123 (similar to gate 2880) has its input connected to recognize count 0 output from the auxiliary timer 160 and has (a) one output connected to enable "X-Stop" count 132 and thereby stop advance of the beam in the lateral direction, and (b) has a second output connected to enable the "Y" reversible counter 58 over Y conductor 154 in path 152 for 12 counts (see FIGS. 7, 8 and 10 —scan 0—1). Gate 124 in numeric scan circuit 123 also provides a signal over conductor 164 to bright up circuit 170 to turn on the beam for display tube 100. As the beam moves upward for 12 counts, the heading marker immediately above and centrally over the numeric ("29" in the present example) is written. The auxiliary timer 160 continues its count, and further gates in numeric scan circuit 123 recognize each count for the successive scan commands, and effect a corresponding adjustment of the inputs to the terminals on the reversible counters 54, 58 to thereby control the beam in tracing of the numeric matrix.

The operating sequences are best understood by reference to the table in FIG. 10 which indicates the manner in which a program may be prepared to control the gates at the different counts (and the wiring of the gates required to write the desired numeric). The gate for sequence 0, as noted above, will have its input connected to recognize digit 0 output from the auxiliary timer 160, and at its output will be connected to enable the stop conductor 132 for the X counter; up conductor 154 for the Y counter, and the bright up mixer 170.

As auxiliary counter 160 advances to count 12, a further gate (not shown) in numeric scan circuit 123 which has its input connected to recognize the count 12 (at which time scan command "1" is initiated), is operative over its output to enable "Y" down conductor 156, and via conductor 164 to turn off the bright up circuit 170. The X counter remains stopped (by reason of the command previously given at count 0). As the auxiliary timer count continues, the beam (turned off) moves downwardly to the point where command "2" is to be initiated.

With reference to FIG. 10 once more (and also FIGS. 7 and 8) it will be apparent that at count 15 the scan command 2 is initiated by a gate having its input wired to recognize count 15, and its output connected to the gate which enables conductor 150 (1/2C) for X counter 54, and one-half clock conductor 160 for the Y reversible counter 58. The beam remains off.

The clock pulse 1/2C (i.e., one-half the clock frequency occurring at only half the rate of the clock pulse will result in the advance of the counter 54, 58 at a slower rate. Since the pulses are being applied to both the X and Y counters, the resultant vector trace will be at a 45° angle to the display vertical and at a reduced rate. The next scan sequence is determined by the input from heading tape counter 114 via numeric decoding logic 118. That is, if the numeric being traces is a one digit number, such as 1, 2, etc., a "single" digit recognition gate is enabled in the number decoding logic circuit 118, which gate has one output connected over path 170 to the digit recognition gates for the digit 0—9 and an additional input connected to recognize count 27 (FIG. 10) of auxiliary timer.

With reference to FIG. 8, it will be seen that when a single digit number is being traced the slope of the beam trace is changed at count 27 (scan sequence command 3). This is accomplished by the input of the "single" digit gate detecting a single digit trace, and feeding a command "clock" over conductor 130, 135 to multivibrators 134, 138 and a command stop over conductor 151 to the multivibrator 148 in gate control 129 (FIG. 4) for X counter 54. The 1/2C input is now stopped and the clock pulse "C" alone will drive the X counter 54. In that the X counter is now counting twice as fast as the Y counter (which is still being driven by 1/2C), the beam will have a larger vector in the horizontal direction (as shown in FIG. 6) and the remainder of the entire numeric matrix (3—53) will be moved to the left by an amount which brings the center of the single tens digit into registration with the marker which appears thereabove. The left-hand trace of FIG. 6 is, of course, blanked out and is used as a "fill" so that the total number of sequences will be the same for single digit numbers and two digit numbers while yet accomplishing centering of both single and dual numerics relative to the center of the index marker.

In the present example, the two digit number "29" is being written, and accordingly the single-digit recognition gate for the "one" digit number will not be enabled. As a result, as count 27 is reached, there will be no change in the commands to the X, Y, Z controls for counters 54, 58 and the scan 3,4 is an extension of scan 2, 3 (FIG. 7).

As the auxiliary timer 160 reaches count 4 (see FIG. 10) scan sequence 4 is initiated by gate G4 which has its input connected to recognize count 47 and its output connected (a) to disable the clock count 1/2C for the X counter 54 via conductor 151, (b) provide an "X-UP" command via conductor 128, (c) disable the 1/2C pulses for the Y counter via conductor 161, and (d) provide a "Y-UP" command for the Y counter 58 via conductor 154 (e) enables one input to gate BV.

Since digit "2" of a two digit number "29" is being traced, the gate G2/3 having its input connected to the logic gate in circuit 118 which recognizes counts 2/3 will be enabled and at its output enable a second input to gate BU to enable the bright up conductor 164. The beam turns on to initiate trace of the leading edge of the trace in the display for the digit 2 at scan sequence command 4. In a similar manner, at scan 5 the gate (not shown) connected to recognize count 50 has its output connected to gate BU and with gate 2/3 continues bright up of the beam during trace 5. Stated in another manner, a bright up gate such as illustrated gate BU, is provided for each digit such as "2." Since the beam is to be on during scan sequences 4, 5, 6, 7, 9, 13, 14, 15, etc., the gate which recognizes the counts for such scans (47, 50, etc.) are connected to one input of the gate BU for digit 2. BU gates are provided in a like manner for the other digits to be traced. The manner in which the auxiliary timer 160 in its further count achieves the trace of number 29 will be apparent from such description and the showing of FIGS. 7, 8 and 9.

With reference once more to the matrices shown in FIGS. 7 and 8, it is noted that at certain points the pattern shows two "7,"etc., which means that a decision is required at the previous number (i.e. 6) as to which of two alternative patterns to follow. Such decision is again made by a logic gate. That is, if digit 2 is being traced, the trace from point 6 proceeds in the direction of 7, 8 by reason of a gate input connected to recognize the auxiliary timer count for scan six, and its second input connected to gate 2/3 the output of such gate is connected to provide "X-UP," one-half clock; "-DOWN," "one-half clock." If digit 1 is being traced a different gate has one input enabled by the number decoding logic circuit 118 and a second input connected to recognize the auxiliary timer count for scan six. The output is connected to move the beam from point 6 laterally toward point 7 (X-Down, C-Wn, Y-stop).

The manner in which the numerics are traced by commands from the logic gates 123 to the reversible counters will be apparent therefrom.

As the auxiliary timer 160 reaches count 220 (scan sequence command 53, the end of the matrix trace) a gate GS in numeric scan circuit 123 connected to recognize count 220 provides a start pulse over conductor 171 to restart the heading tape counter 114 and via the same output disables auxiliary timer 160. As is apparent from FIGS. 7 and 8, the electron beam is back at the point from which the matrix was started, and at a fixed time (and count) subsequent to start of the auxiliary timer 160.

The scan pattern now resumes (X-UP, Y-STOP) and effects trace in the sequence of the index markings at 2° intervals to the right of the first numeric. Since the range of the tape is 17°, one additional occurrence of a numeric matrix scan will be encountered (i.e., "30").

Figure 5:
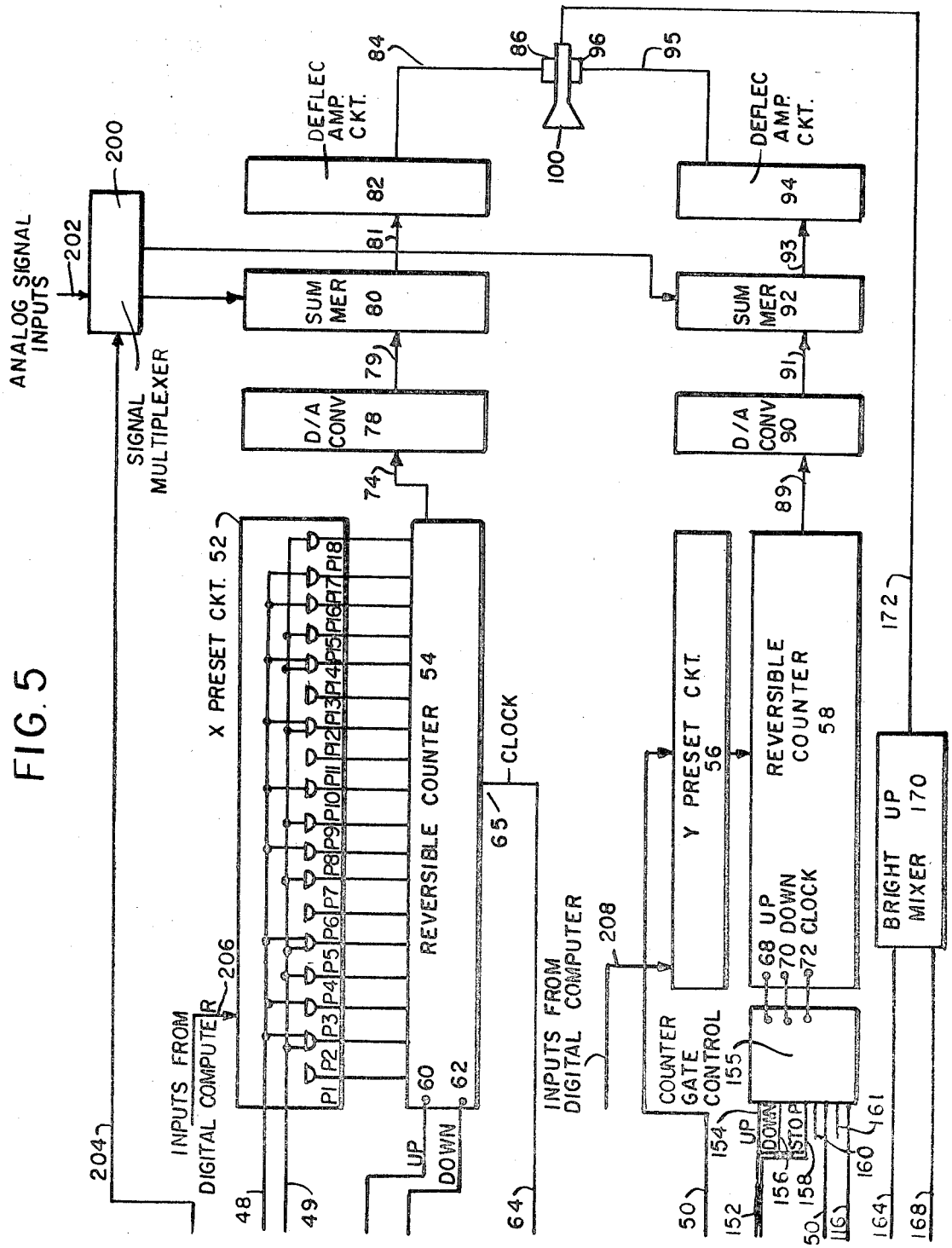

With reference to FIG. 4, when count 3890 is reached a gate 46 via conductor 48 disables the heading tape counter 114 and enables preset circuits 52, 56, to set counters 54, 58 at counts 262, 444 to thereby move the beam to position 61s for the purpose of tracing the heading indicator reference pointer 61s—63s in FIG. 1. At this time, the heading tape counter will have moved through 17.5° of information, and such information will have been fed into the display to produce the tape of FIG. 1. As shown in FIG. 5, beam "fly-to" occurs between counts 3890—3940 and trace of the heading pointer occurs between points 3940—3952.

It is seen from the foregoing that the novel circuitry can be used to provide a tape or scale display in response to digital input signals. More significantly, such display may comprise a selected portion of a tape having a substantially greater range than is shown on the display, and with changing information the tape moves to continuously update the information presented to the display.

In the foregoing description, there was set forth a system in which the equipment generates additional symbols such as a flight command symbol for presentation on the same display with the tape display along with a typical program for beam control used in effecting such manner of display.

Various means of positioning such symbol and/or rotating the symbol may be used with such circuitry. If desired, the system can be tied directly into a digital computer by using bit parallel data over conductors 206, 208 to preset counters 54, 58 directly and thereby adjust the symbol to the position indicated by signals fed into the computer by suitable sensor means.

In yet another mode, the novel system is adapted to insert analog voltage input signals to position the symbols which have been generated in response to digital inputs. This is accomplished by using a signal multiplexer 200 which samples the input signal lines 202 at times and for periods determined by scan control logic 40 and timing pulses over conductor 204 (reference "Electronic Analog & Hybrid Computers," Korn & Korn, McGraw-Hill, 1964, Para.10-6, 11-12). In such event, sensor information may be provided over a plurality of different paths and the circuit 200 will sample the different paths on a time sharing basis. By way of example, an analog voltage which represents the difference between a desired roll condition and the actual roll condition of the aircraft may be provided over one path to multiplexer 200. At a predetermined time during each cycle of the equipment, logic circuitry 40 controls the signal multiplexer 200 to sample such voltage, and to apply the resultant signal to the summer circuits 80, 92 for mixing with the flight command signals as generated by the counters 54, 58 to thereby adjust the flight path symbol to the desired roll attitude and the desired position on the display.

An additional feature of the novel system is the manner in which it is possible, through a simple programming change, to produce changes in the size of a symbol being generated by a matrix. More specifically a number, polygon or other geometric pattern provided by a matrix may be provided in various sizes on the display by merely changing the clock impulse over conductor 116 to the auxiliary timer 160 to the 1/2C input. With reference to FIG. 11, an octagon A produced by the auxiliary timer circuit 160 and numeric scan intensity control logic circuit 123 can be operated to produce octagon B by simply switching from clock input C to clock input 1/2C. The provision of pulses at other clock input rates will effect a corresponding change in the size of the octagon.

While what is described is regarded to be a preferred embodiment of the invention, it will be apparent that variations, rearrangements, modifications and changes may be made therein without departing from the scope of the present invention as defined by the appended claims.

We claim:

1. In a video display system for providing a display on a video display device of a selected segment of a tape display having numeric characters located at predetermined positions thereon comprising input means for providing an input signal set representative of one point on the tape segment to be displayed, translation means for providing signals which identify the segment of said tape to be displayed comprised of a plurality of points including said one point and at least one numeric character, means connected to said translation means comprising a first decoding means for providing a first signal set which represents successive increments of said segment, and numeric generator means for providing a second signal set for each numeric which occurs at the predetermined positions in the selected segment, and circuit control means responsive to said first signal set to control advance of the beam along said indicated tape segment and responsive to said second signal set to control a calligraphic trace of a numeric pattern as the beam advances to a predetermined position which occurs within the selected segment.

2. A display system as set forth in claim 1 in which said translation means is operative in response to a change in the point represented by said input signal set to effect a corresponding change in the segment of the tape which is presented on said display.

3. A display system as set forth in claim 1 in which said translation means comprises counter means, means for presetting said counter means to a starting count determined by the value of said input signal set, and means for driving said counter means a preset number of counts to provide signals which successively identify the plurality of points in the selected segment.

4. A system as set forth in claim 1 in which said input signal set represents the information to be presented in the middle of the tape segment to be displayed, and in which said translation means includes means for modifying said input signal set to a value which represents the starting point of the tape segment on said display.

5. A display system as set forth in claim 1 which includes output means for said translation means, and index marker means connected to said output means for providing index marker signals for modulating the beam generation of said display device to provide index markers between the numerics presented on said display.

6. In a video display system for providing a display of only a selected segment of a numeric tape on a video display device which segment includes a plurality of positions and at least one numeric character at a predetermined one of said positions, said system comprising input means for providing an input signal set representative of a selected position in said tape segment, translation means connected to said input means, means connected to said translation means including first decoding means for providing a first signal set representing a segment of said tape of a predetermined length which includes said selected position, and second decoding means for providing a second signal set which represents the numeric in said segment to be displayed on said tape, numeric generator means for providing a third signal set to effect a numeric pattern trace at each of said predetermined positions in the selected segment with advance of the beam thereto, and beam control means for adjusting the electron beam of said display device responsive to said first, second and third signal sets in the trace of the selected tape segment including the calligraphic trace of a numeric pattern at each predetermined position in the selected segment.

7. A display system as set forth in claim 6 which includes further symbol generation means for providing enabling signals to said beam control means to effect the trace of further symbols on said display, and main timer means including means for enabling said further symbol generating means during one period of a predetermined program, and means for enabling said translation means during a different period of said program.

8. A display system as set forth in claim 6 in which said beam control means comprises a first reversible counter for providing digital output signals identifying the X coordinate of the beam, and a second reversible counter for providing digital output signals identifying the Y coordinate of the beam, and means for adjusting the beam to a position related to the output counts of said first and second reversible counters, and in which said beam control means further includes enabling means responsive to said first and third signal sets to provide up, down and stop signals to said reversible counters to vary the count output thereof.

9. A display system as set forth in claim 8 in which each of said reversible counters has a clock pulse input for driving the counter in the direction determined by the signals from said enabling means, and means for adjusting the rate of the clock pulses input to different values.

10. A display system as set forth in claim 8 which includes preset means for each of said reversible counters, and means for selectively marking said preset means to a predetermined value to thereby move said beam directly to a desired position on the display.

11. A display system as set forth in claim 8 in which said beam control means further includes a digital to analog converter connected to the outputs of said reversible counters, summer circuits for coupling the analog output of said converter to said display device, and signal multiplex means for selectively coupling analog signal inputs to said summer means for mixing with the analog output of said converters.

12. A display system as set forth in claim 6 in which said numeric generator means comprises an auxiliary timer, and a plurality of logic gates, means connecting said auxiliary timer to enable said logic gates in a predetermined sequence, and means connecting the output of said logic gates to said beam control means to effect a predetermined trace on said display, and which further comprises logic gates responsive to said second signal set for enabling said beam during the calligraphic trace of the numeric patterns to effect display of the numeric thereat represented by said second signal set.

13. A system as set forth in claim 6 in which said translation means comprises a first counter means which is operative a predetermined number of counts to define the selected segment of information to be presented on the display, and said numeric generator means comprises a second counter means which disables said first counter means during trace of the numeric pattern on said display at one of said predetermined positions.

14. In a video display system for providing a display of vehicle heading information in a numeric scale presentation on a video display device comprising an input circuit for continually providing input signals representative of the changing heading of the vehicle, translation means responsive to said input heading signal to provide signals which represent a segment of the numeric scale which includes the heading represented by said heading input signal and at least one numeric at a predetermined position in said segment, output means for said translation means, decoding means connected to said output means, beam control means for adjusting the beam of said display device to different positions on said display device, first logic means controlled by said decoding means to enable said beam control means in the trace of successive segments of the scale, numeric generator means including means for generating signals to enable said beam trace control means in the calligraphic trace of a numeric pattern responsive to advance of the beam to a numeric position on said segment, and second logic means selectively enabling said beam during the trace of each numeric pattern to provide a visual display of each numeric indicated by the output of said translation means.

15. In a video display system for providing a display of aircraft heading in a window compass type presentation, the window portion of the display comprising only a segment of the 360° display capability of the compass presentation, said system comprising input means for continuously providing an input signal set representative of the actual aircraft heading, means for converting said input signal set for said heading to a further signal set which represents one limit of the compass segment to be displayed with said actual heading in the middle of the displayed segment, means responsive to said further signal set for providing a series of successive signals which represent successive positions on the selected segments and the numeric positions thereon, numeric generator means for generating signals to provide a numeric pattern trace at predetermined positions on each segment, and means responsive to said series of successive signals for controlling the electron beam of said display device to correspondingly advance along said segment with the receipt of each of said successive signals and responsive to the signals from said numeric generator means to calligraphically write each numeric as the tape advances to the corresponding predetermined position on the selected segment.

16. In a video display system for providing a display of tape having numeric information at predetermined positions thereon in a window type presentation, the window portion of the display comprising only a segment of the entire display capability of the entire tape, said system comprising input means for providing an input signal set representative of one position on said tape, first means for converting said input signal set to a first plurality of signal sets, each of which signal sets represents a successive position on a tape segment of predetermined length which includes said one position, and a second signal set which represents each numeric which occurs in said segment, and beam control means connected to said first means for advancing the electron beam along the selected segment in response to said first signal set and responsive to said second signal set to calligraphically write said numeric which occurs in said segment.

17. In a video display system for providing a display of a selected tape segment having numeric information at predetermined positions thereon, said system comprising input means for continuously providing an input signal set representative of a position on said tape, means responsive thereto to provide a plurality of digital signal sets which represent a segment including said position for display, and a further digital signal set comprised of X and Y signals for effecting trace of a numeric on said segment, and beam control means for controlling calligraphic writing of the indicated numeric on the display device comprising digital responsive means including first means for providing a digital signal for advancing the beam along the tape segment in response to each of said plurality of digital signal sets, said first means being responsive to store X signals of said further digital set with advance of the beam to a numeric position to provide a digital value related to the desired X position of the beam, and second means for providing a digital value related to the desired Y position of the beam indicated by the Y signal of said further digital set, a digital to analog converter for each of said first and second means, and means for coupling the analog output of said converters to the deflection circuits for said display device.

18. A display system as set forth in claim 17 in which said first means includes a first reversible counter for providing digital output signals identifying the X coordinate of the beam, and said second means includes a second reversible counter for providing digital output signals identifying the Y coordinate of the beam, and in which said first and second means each include enabling means for providing up and down signals to said reversible counters to vary the count output thereof in response to the digital set input thereto.

19. A display system as set forth in claim 18 in which each of said reversible counters has a clock pulse input for driving the counter in the direction determined by the signals input thereto from said enabling means, and means for adjusting the rate of the clock pulses input to different values.

20. In a video display system for providing a display of a selected segment of an aircraft heading tape having numeric characters located at predetermined positions thereon, said system comprising input means for continuously providing an input signal set representative of the actual aircraft heading, means for converting said input signal set to a digital signal which represents one limit of the tape segment to be displayed with said actual heading in the middle of said display window, counter means, transfer means for setting said counter means to a value which represents the lower limit of the tape segment to be displayed, clock means for advancing said counter means through a series of counts related to the length of the segment to be displayed, output means for said counter means for providing counts representative of different positions along said tape segment, beam control means for adjusting the beam to different positions on said display device, decoding means for decoding each count of said counter means including number decoding logic means for providing a first signal set for each successive count to indicate correspondingly different positions on said compass segment, gate means controlled by said first signal set to enable said beam control means to advance said beam to successive positions along the tape segment to be displayed, auxiliary timer means connected to said counter means for providing a second signal set for each numeric to be displayed in the selected compass segment, first logic means controlled by the second signal set output therefrom responsive to a count indicating advance of the beam along the segment to a predetermined position at which a numeric is to be displayed to enable said beam control means in the trace of a preprogrammed pattern, and second logic means connected to said number decoding logic means and said auxiliary timer means operative to enable said beam during the trace of each preprogrammed pattern to display each numeric at its predetermined position on the tape segment.

75